(12) United States Patent
Choi et al.

(10) Patent No.: US 7,123,568 B2
(45) Date of Patent: Oct. 17, 2006

(54) OPTICAL RECORDING MEDIUM ON WHICH A WOBBLE SIGNAL HAVING HEADER INFORMATION IS RECORDED, AN APPARATUS AND METHOD OF RECORDING WOBBLE SIGNAL, AND AN APPARATUS AND METHOD OF REPRODUCING THE WOBBLE SIGNAL

(75) Inventors: Byoung-ho Choi, Gyeonggi-do (KR); In-sik Park, Gyeonggi-do (KR); Jae-seong Shim, Seoul (KR); Kyung-geun Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 411 days.

(21) Appl. No.: 09/994,785

(22) Filed: Nov. 28, 2001

(65) Prior Publication Data
US 2002/0172122 A1     Nov. 21, 2002

(30) Foreign Application Priority Data
May 16, 2001   (KR) ............................... 2001-26782

(51) Int. Cl.
G11B 7/24        (2006.01)

(52) U.S. Cl. ................................. 369/59.25; 369/275.3

(58) Field of Classification Search ............. 369/59.25, 369/275.3, 47.22, 47.31
See application file for complete search history.

(56) References Cited

U.S. PATENT DOCUMENTS

| | | | | |
|---|---|---|---|---|
| 5,508,985 A | * | 4/1996 | Fairchild et al. | 369/47.22 |
| 5,870,375 A | * | 2/1999 | Maeda et al. | 369/275.3 |
| 6,046,969 A | * | 4/2000 | Towner et al. | 369/47.31 |
| 6,097,695 A | * | 8/2000 | Kobayashi | 369/275.4 |
| 6,181,658 B1 | * | 1/2001 | Van Den Enden et al. | 369/59.25 |
| 6,611,486 B1 | * | 8/2003 | Kawase et al. | 369/59.25 |

FOREIGN PATENT DOCUMENTS

| | | |
|---|---|---|
| JP | 6-338066 | 12/1994 |
| JP | 2003-099955 | 4/2003 |

* cited by examiner

*Primary Examiner*—Brian E. Miller
*Assistant Examiner*—Peter Vincent Agustin
(74) *Attorney, Agent, or Firm*—Stein, McEwen & Bui, LLP

(57) ABSTRACT

An optical recording medium, on which a wobble signal having header information is recorded, an apparatus and method of recording the wobble signal, and an apparatus and method of reproducing the wobble signal are provided. The optical recording medium has a wobbled track on which user data is recorded. The wobble signal is recorded on the wobbled track. The wobble signal is a single-frequency signal having at least edge-modulated first header information. Accordingly, a clock signal as well as header information can be extracted more stably from the wobble signal.

17 Claims, 21 Drawing Sheets

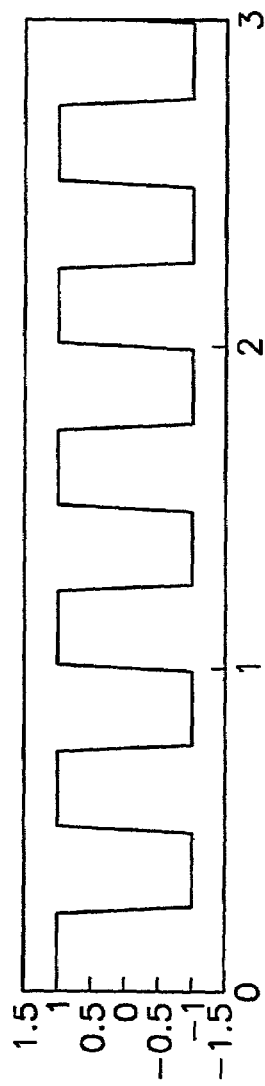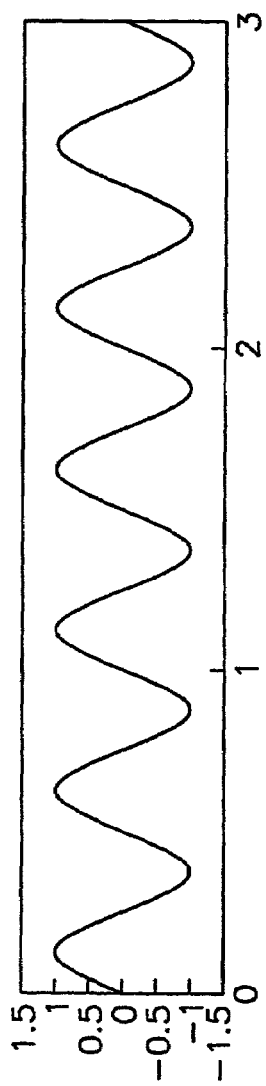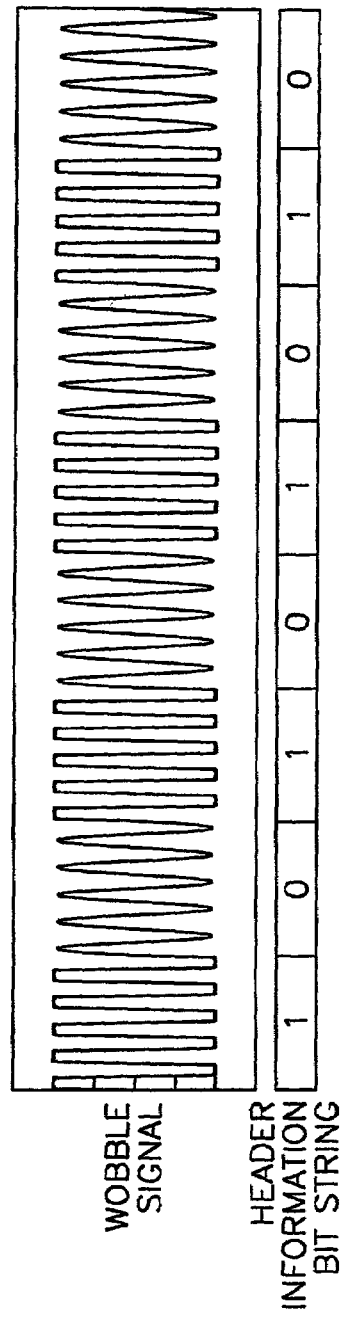
FIG. 6A
FIG. 6B
FIG. 7

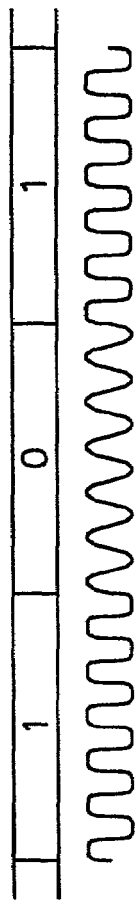
FIG. 10A  FIRST HEADER
INFORMATION BIT STRING
EDGE-MODULATED SIGNAL
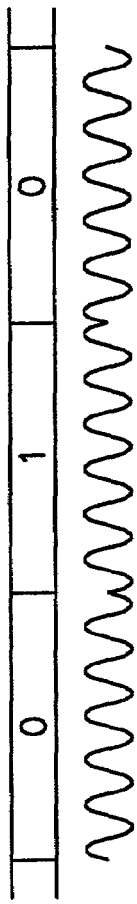
FIG. 10B  SECOND HEADER
INFORMATION BIT STRING
PHASE-MODULATED SIGNAL
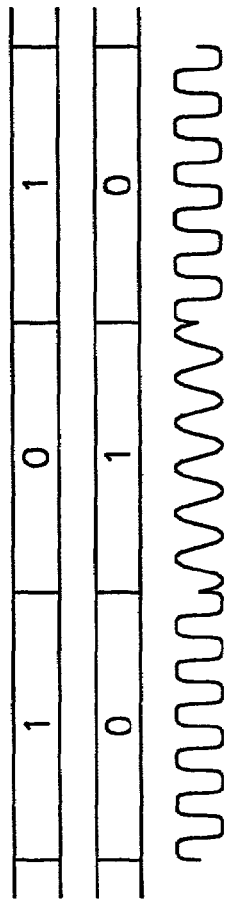
FIG. 10C  FIRST HEADER
INFORMATION BIT STRING
SECOND HEADER
INFORMATION BIT STRING
WOBBLE SIGNAL

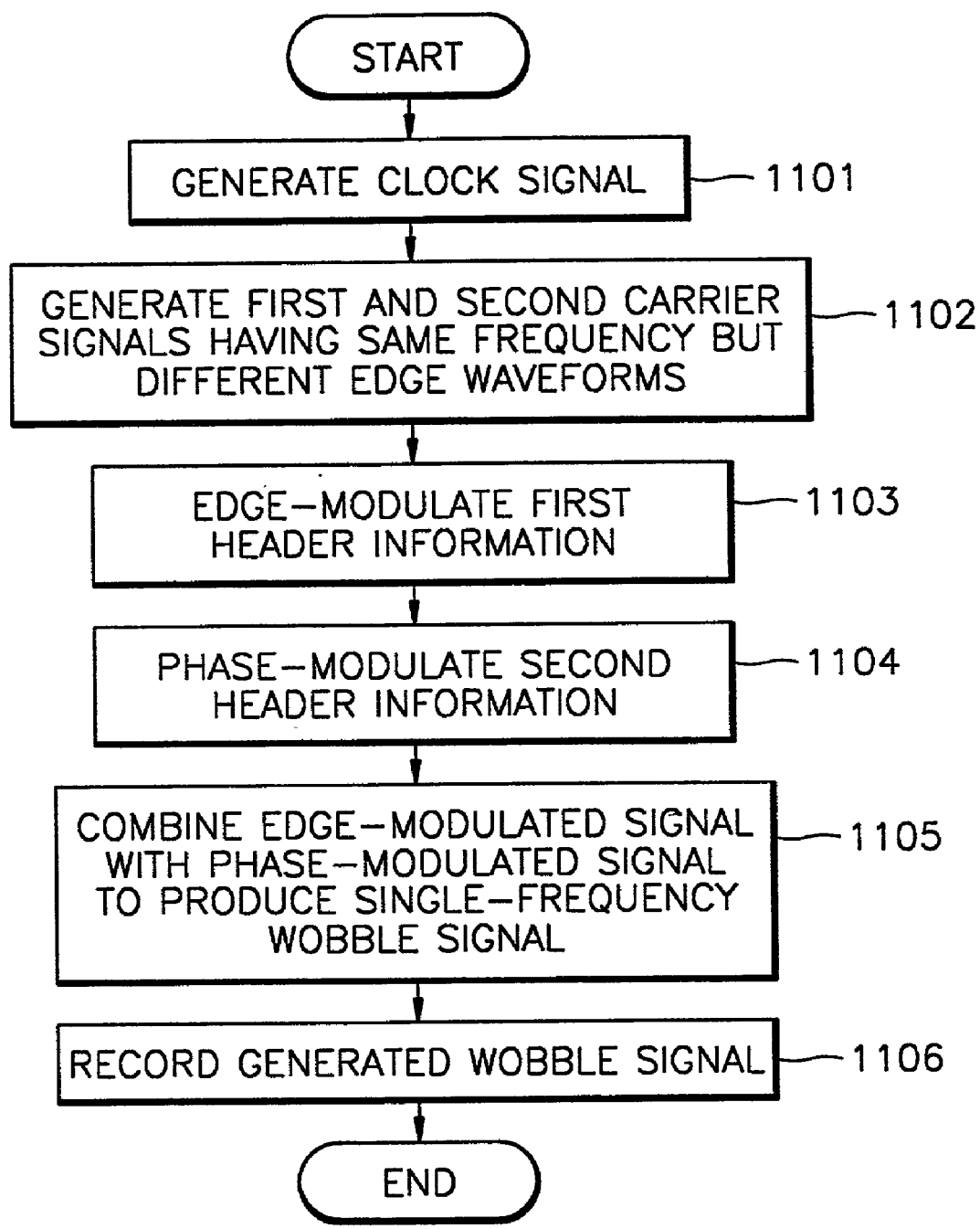

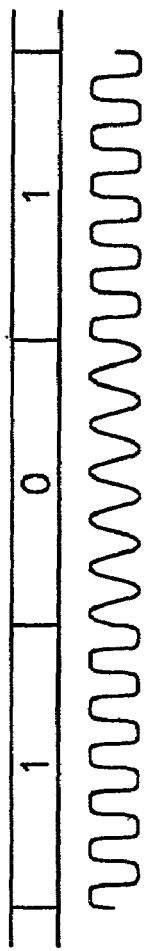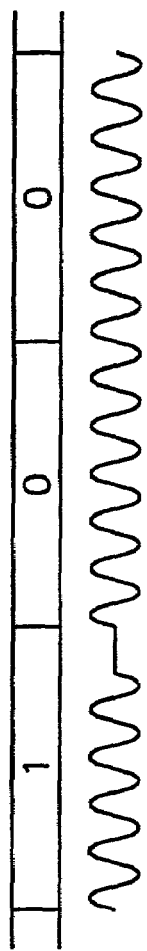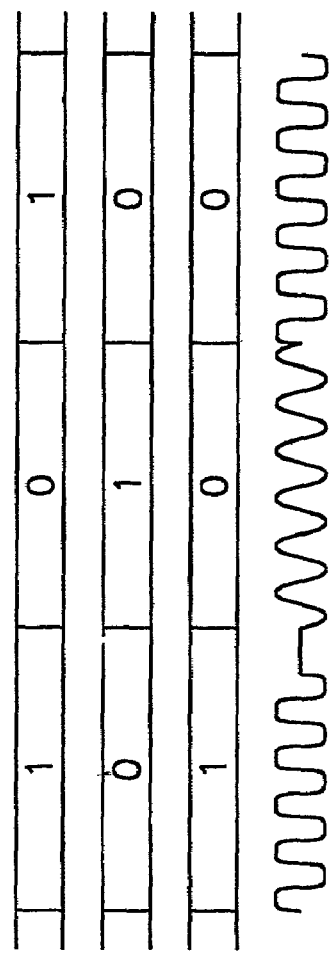
FIG. 12A  FIRST HEADER INFORMATION BIT STRING / EDGE-MODULATED SIGNAL
FIG. 12B  SECOND HEADER INFORMATION BIT STRING / PHASE-MODULATED SIGNAL
FIG. 12C  THIRD HEADER INFORMATION BIT STRING / MODULATED SIGNAL
FIG. 12D  FIRST HEADER INFORMATION BIT STRING / SECOND HEADER INFORMATION BIT STRING / THIRD HEADER INFORMATION BIT STRING / WOBBLE SIGNAL

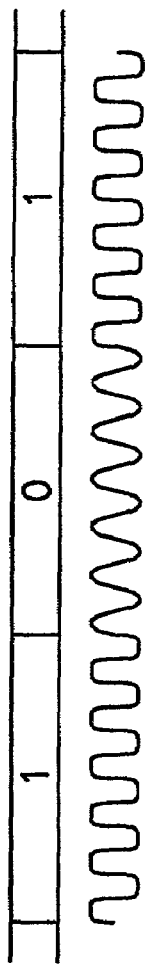
FIG. 12E  FIRST HEADER INFORMATION BIT STRING
EDGE-MODULATED SIGNAL
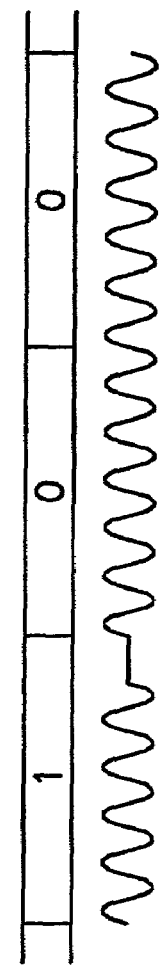
FIG. 12F  SECOND HEADER INFORMATION BIT STRING
MODULATED SIGNAL
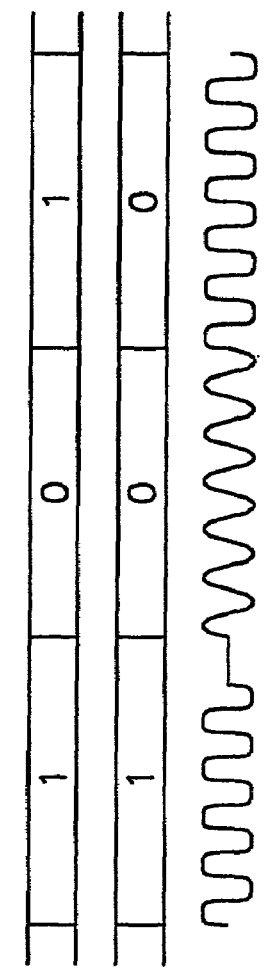
FIG. 12G  FIRST HEADER INFORMATION BIT STRING
SECOND HEADER INFORMATION BIT STRING
WOBBLE SIGNAL

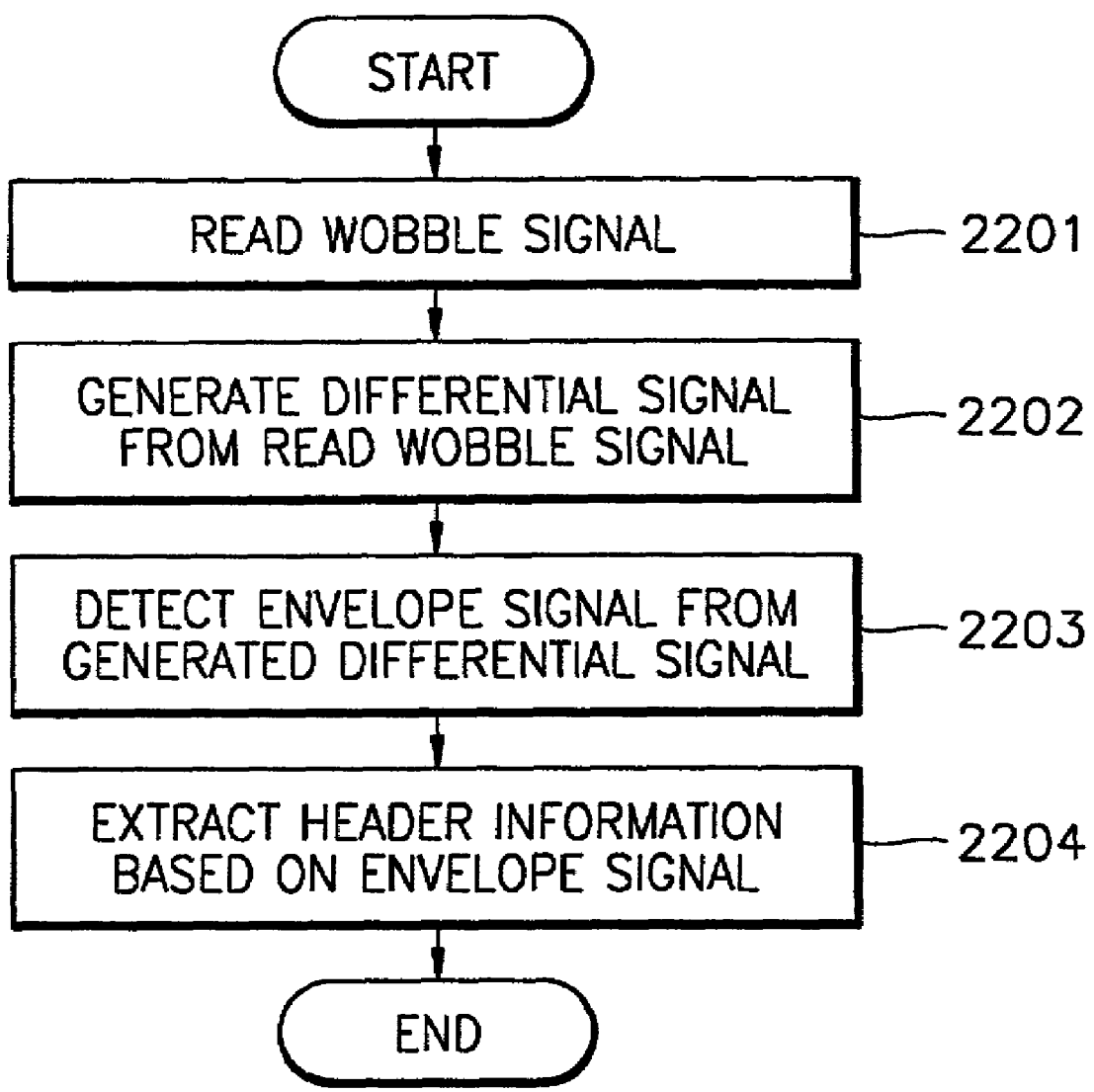

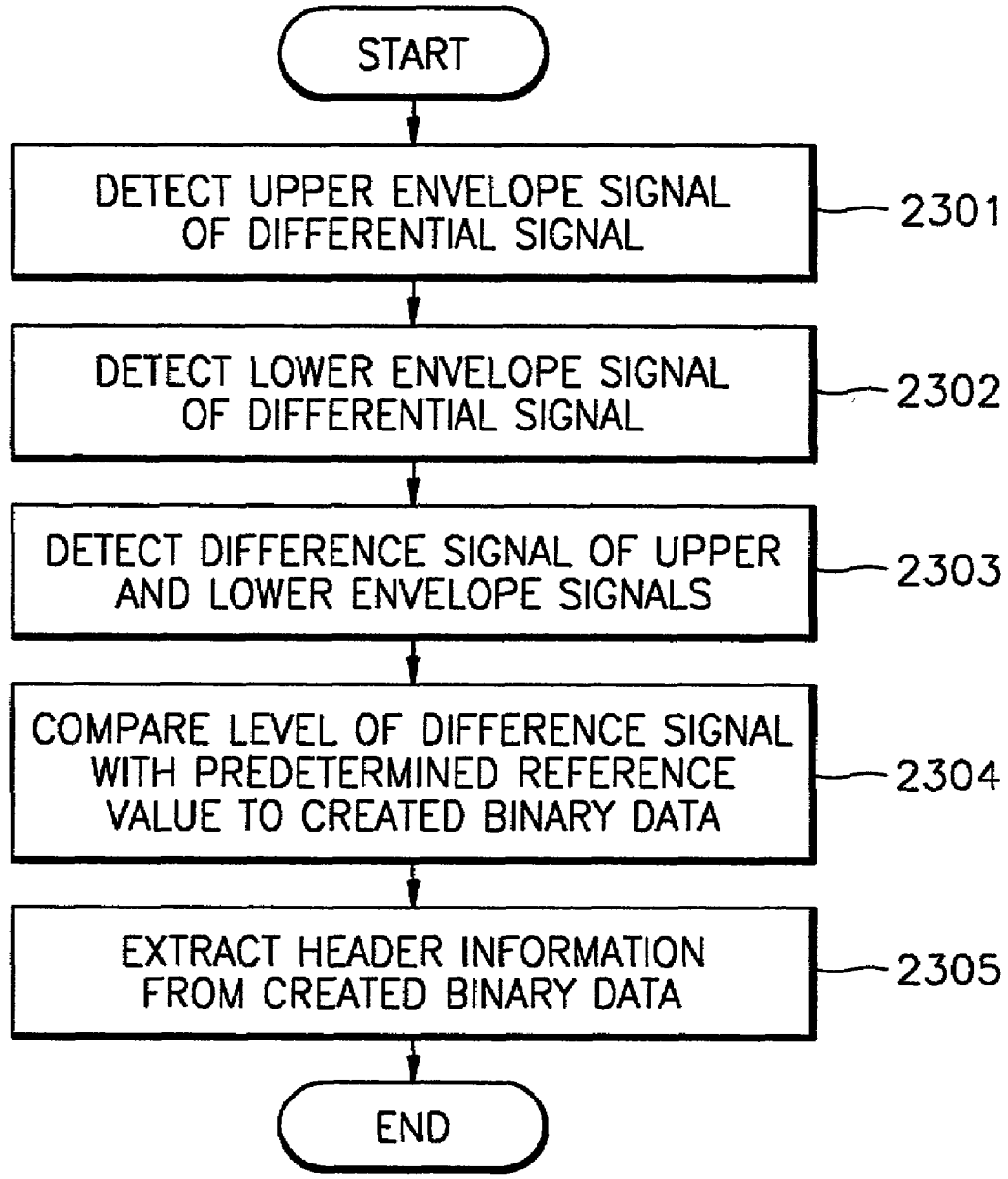

OPTICAL RECORDING MEDIUM ON WHICH A WOBBLE SIGNAL HAVING HEADER INFORMATION IS RECORDED, AN APPARATUS AND METHOD OF RECORDING WOBBLE SIGNAL, AND AN APPARATUS AND METHOD OF REPRODUCING THE WOBBLE SIGNAL

CROSS-REFERENCE TO RELATED APPLICATIONS

This application claims the benefit of Korean Patent Application No. 2001-26782 filed on May 16, 2001, in the Korean Industrial Property Office, the disclosure of which is incorporated herein by reference.

BACKGROUND OF THE INVENTION

1. Field of the Invention

The present invention relates to an optical recording medium, and more particularly, to an optical recording medium having wobbled tracks on which a wobble signal is recorded, an apparatus and method of recording the wobble signal, and an apparatus and method of reproducing the wobble signal.

2. Description of the Related Art

Recordable optical discs such as a Digital Versatile Disc-RAM (DVD-RAM) have concentric or spiral tracks including groove and land tracks. A wobble signal is recorded on the tracks. A track on which the wobble signal is recorded is called a wobbled track. The wobble signal is used in recording an auxiliary clock signal obtaining synchronization information while recording and reproducing information. Hence, the wobble signal has a frequency band that has no impact upon a tracking servo-mechanism provided in a recording and/or reproducing apparatus. The DVD specifications for Rewritable Disc Version 2.0 support a servo band of approximately 3 KHz to radially track and a wobble signal frequency of approximately 157 KHz at standard linear velocity.

User data is recorded on a wobbled track by an optical pickup. To record user data using a laser beam, an optical pickup provided in a recording apparatus and oscillating a recording laser is allowed to move to a desired location. To this end, addressing information used to move the pickup to its desired location is recorded on an optical disc. Here, addressing information refers to identification information assigned for each unit recording block when an information track is divided into a plurality of unit recording blocks.

A representative conventional approach to record addressing information on an optical disc involves recording addressing information on a header region provided separately from tracks on which user data is written. FIG. 1 is a schematic diagram of a conventional optical disc. Referring to FIG. 1, the conventional optical disc has tracks including groove and land tracks where user data can be written, and a header region where header information is recorded in the form of pre-pits. The header region is located at a predefined position in a sector (unit recording block), and addressing information recorded in the header region is used to allow a pick-up device provided in a recording and/or reproducing apparatus to easily move to its desired location. Furthermore, the addressing information can identify information such as a sector number, a sector type, and servo-control information recorded in the header region.

Header information recording supported by the 1999 DVD-RAM standard version 2.0 uses Complementary Allocated Pit Address (CAPA) techniques. According to CAPA techniques, as shown in FIG. 1, header information is recorded in pairs, each pair of information deviating to the right and left of the center of an information track by a half-track.

However, providing an extra header region complicates the fabrication process of an optical disk while requiring an additional circuit to compensate for a wobble signal, since the wobble signal cannot be obtained while a pick-up device passes the header region. Furthermore, in spite of an increased demand for high-density recording media due to the use of multimedia contents, providing an extra header region results in a smaller region in which user data can be recorded.

SUMMARY OF THE INVENTION

Accordingly, it is an object of the present invention to provide an optical recording medium on which a wobble signal is recorded, an apparatus and method of recording the wobble signal, and an apparatus and method of reproducing the wobble signal, which are capable of recording more user data.

It is another object of the present invention to provide an optical recording medium on which a wobble signal is recorded, an apparatus and method of recording the wobble signal, and an apparatus and method of reproducing the wobble signal, which are capable of extracting header information while providing a more stable clock signal.

Additional objects and advantages of the invention will be set forth in part in the description which follows and, in part, will be obvious from the description, or may be learned by practice of the invention.

The foregoing objects of the present invention are achieved by providing an optical recording medium including a wobbled track on which user data is recorded. A wobble signal recorded on the wobbled track is a single-frequency signal having edge-modulated first header information.

Additionally, second header information may be provided, which is phase-modulated and/or third header information may be provided, which is amplitude-modulated in at least a part of an interval of the wobble signal where the first header information has been edge-modulated. The header information contains addressing information.

The above and other objects of the present invention may also be achieved by providing an apparatus recording a wobble signal on an optical recording medium. The apparatus comprises: a wobble signal generator generating a single-frequency wobble signal having header information which is edge-modulated based on first and second carrier signals having the same frequency but different edge waveforms; and a recording unit recording the wobble signal generated by the wobble signal generator on the optical recording medium.

The wobble signal generator comprises: a clock generator generating a clock signal; a carrier signal generator generating first and second carrier signals based on the clock signal; and an edge-modulator that receives header information and edge-modulates the header information using the first and second carrier signals output from the carrier signal generator based on the clock signal. The edge-modulator transforms high and low levels of digital data representing the header information into the first and second carrier signals, respectively, to modulate the digital data into an analog signal.

The above and other objects of the present invention may also be achieved by providing an apparatus recording a wobble signal on an optical recording medium comprising: a wobble signal generator generating a single-frequency wobble signal having first and second header information, wherein the first header information is edge-modulated based on first and second carrier signals having the same frequency but different edge waveforms with respect to each other, and the second header information is phase-modulated based on the first or second carrier signal; and a recording unit recording a wobble signal generated by the wobble signal generator on the optical recording medium.

The wobble signal generator comprises: a carrier signal generator generating the first and second carrier signals; an edge-modulator edge-modulating the first header information using the first and second carrier signals; a phase-modulator phase-modulating the second header information using the first or second carrier signal; and a signal synthesizer that combines the edge-modulated signal output from the edge-modulator with the phase-modulated signal output from the phase-modulator and outputs the single-frequency wobble signal.

The above and other objects of the present invention may also be achieved by providing a method of recording a wobble signal on an optical recording medium. The method comprises: generating first and second carrier signals having the same frequency but different edge waveforms; generating a single-frequency wobble signal having header information which is edge-modulated using the generated first and second carrier signals; and recording the generated single-frequency wobble signal.

The operation of generating a single-frequency wobble signal as above comprises the operations of: generating a clock signal; and edge-modulating header information using the first and second carrier signals in accordance with the generated clock signal. In the operation of edge-modulating header information, high and low levels of digital data representing header information are transformed into the first and second carrier signals, respectively, to modulate the digital data into an analog signal.

The above and other objects of the present invention may also be achieved by providing a method of recording a wobble signal on an optical medium comprising the operations of: generating first and second carrier signals having the same frequency but different edge waveforms with respect to each other; generating a single-frequency wobble signal having first header information which is edge-modulated using the generated first and second carrier signals and second header information which is phase-modulated using the first or second carrier signal; and recording the generated single-frequency wobble signal. The operation of generating a single-frequency wobble signal comprises the operations of generating a clock signal; using the first and second carrier signals to edge-modulate the first header information in accordance with the generated clock signal; using the first or second carrier signal to phase-modulate the second header information in accordance with the generated clock signal; and overlapping the edge-modulated signal and the phase-modulated signal to generate the single-frequency wobble signal.

The above and other objects of the present invention may also be achieved by providing a method of reproducing header information from a wobble signal recorded on an optical recording medium. The method comprises the operation of: reading a single-frequency wobble signal having header information which is edge-modulated by using first and second carrier signals having the same frequency but different edge waveforms; generating duty signals for the read wobble signal; and comparing the duty signals to extract header information.

The operation of generating duty signals further comprises the operations of: generating duty signals at upper levels of the read wobble signal which are higher than central levels thereof by predetermined levels; and generating duty signals at lower levels of the read wobble signal which are lower than the central levels of the read wobble signal by predetermined levels. The operation of comparing the duty signals comprises the operations of: comparing duty ratios of the duty signals generated in the operations of generating duty signals of the upper and lower levels of the read wobble signal to output binary data; and extracting the header information from the output binary data.

The above and other objects of the present invention may also be achieved by providing a method of reproducing header information from a wobble signal recorded on an optical recording medium comprising: reading a single-frequency wobble signal having header information which is edge-modulated using first and second carrier signals having the same frequency but different edge waveforms; detecting levels of the read wobble signal at a predetermined phase; and comparing the detected levels with a predetermined reference value to extract header information. The operation of comparing the detected levels with a predetermined reference value in this embodiment comprises the operations of comparing the detected levels with a predetermined reference value to output binary data; and demodulating the output binary data to extract header information.

The above and other objects of the present invention may also be achieved by providing a method of reproducing header information from a wobble signal recorded on an optical recording medium comprising: reading a single-frequency wobble signal having header information which is edge-modulated using first and second carrier signals having the same frequency but different edge waveforms; generating a differential signal from the read wobble signal; and extracting header information based on the generated differential signal. The operation of extracting header information in this embodiment comprises the operations of: detecting an upper envelope signal of the differential signal; detecting a lower envelope signal of the differential signal; and extracting header information based on the upper and lower envelope signals. The operation of extracting header information based on the upper and lower envelope signals comprises the operations of obtaining a difference signal by subtracting the lower envelope signal from the upper envelope signal; comparing the level of the obtained difference signal with a predetermined reference value to output binary data; and demodulating the output binary data to extract header information.

The above and other objects of the present invention may also be achieved by providing an apparatus reproducing header information from a wobble signal. The apparatus comprises: a wobble signal reading unit reading a single-frequency wobble signal having header information which is edge-modulated using first and second carrier signals having the same frequency but different edge waveforms with respect to each other; a duty signal generator generating duty signals from the read wobble signal; and a header information extractor comparing the generated duty signals and extracting header information.

The duty signal generator in this embodiment generates duty signals at upper levels of the read wobble signal which are higher than central levels thereof by predetermined levels and at lower levels of the read wobble signal which are lower than the central levels thereof by predetermined levels. The header information extractor in this embodiment comprises: a comparator comparing duty ratios of corresponding duty signals generated by the duty signal generator and outputting binary data; and a demodulator demodulating the header information from the binary data output by the comparator.

The above and other objects of the present invention may also be achieved by providing an apparatus reproducing header information from a wobble signal comprising: a wobble signal reading unit reading a single-frequency wobble signal having header information which is edge-modulated using first and second carrier signals having the same frequency but different edge waveforms; a level detector detecting levels of the read wobble signal at a predetermined phase; and a header information extractor extracting header information by comparing the detected levels with a predetermined reference value.

The header information extractor in this embodiment comprises: a comparator comparing the detected levels with a predetermined reference value and outputting binary data; and a demodulator demodulating the binary data output by the comparator and extracting header information.

The above and other objects of the present invention may also be achieved by providing an apparatus reproducing header information from a wobble signal comprising: a wobble signal reading unit reading a single-frequency wobble signal having header information which is edge-modulated using first and second signals having the same frequency but different edge waveforms with respect to each other; a differentiator generating a differential signal for the read wobble signal; and a header information extractor extracting header information based on the generated differential signal.

The header information extractor in this embodiment comprises an envelope detector detecting upper and lower envelope signals from the differential signal, wherein the header information extractor extracts header information based on the upper and lower envelope signals detected by the envelope detector. The header information extractor further comprises: an operator obtaining a difference signal of the upper and lower envelope signals; a comparator comparing the level of the difference signal obtained by the operator with a predetermined reference value and outputting binary data; and a demodulator demodulating the output binary data and extracting header information.

BRIEF DESCRIPTION OF THE DRAWINGS

These and other objects and advantages of the present invention will become apparent and more readily appreciated from the following description of the embodiments, taken in conjunction with the accompany drawings of which:

FIGS. 6A and 6B shows schematic waveforms of first and second signals generated by the carrier signal generator of FIG. 5;

FIG. 7 shows schematic waveform of a wobble signal edge-modulated by the first and second signals of FIGS. 6A and 6B;

FIGS. 10A through 10C show schematic waveforms of signals generated by the wobble signal generator of FIG. 9;

FIG. 11 is a flowchart of a wobble signal recording method according to the embodiment of FIG. 9;

FIGS. 12A through 12G are reference diagrams showing other examples of wobble signals according to the present invention;

FIG. 22 is a flowchart of a header information extraction method according to the embodiment of FIG. 20; and FIG. 23 is a flowchart explaining an example of the operations shown in FIG. 22.

DETAILED DESCRIPTION OF THE PREFERRED EMBODIMENTS

Figure 1:
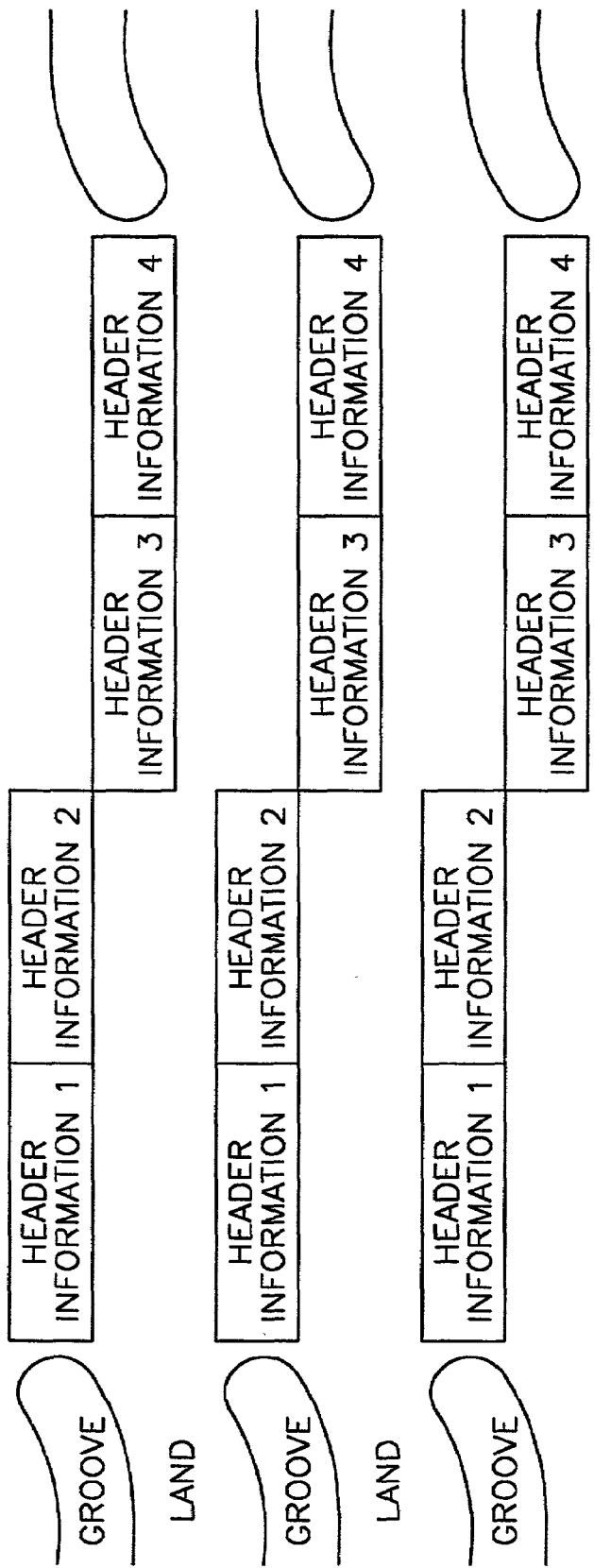
FIG. 1 is a schematic diagram of a conventional optical disc.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 2A:
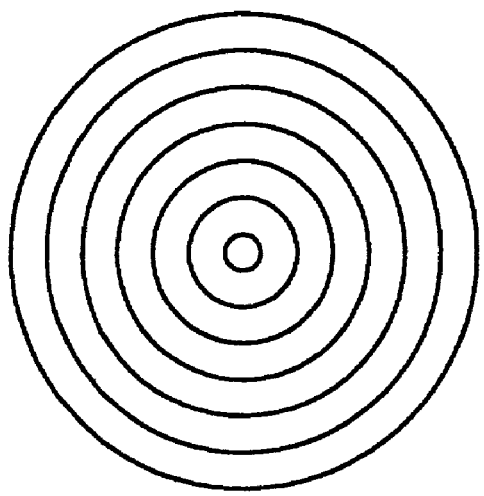
FIGS. 2A and 2B are schematic diagrams of an optical recording medium according to an embodiment of the present invention.
Figure 2B:
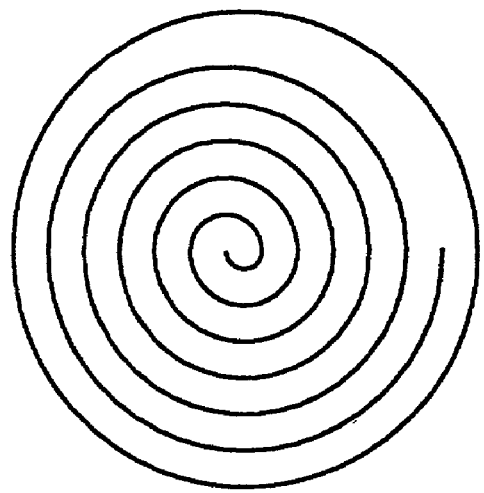

Referring to FIGS. 2A and 2B, concentric (FIG. 2A) or spiral (FIG. 2B) tracks including land and groove tracks are formed on an optical disk according to an embodiment of the present invention. A wobble signal is recorded on the tracks. The wobble signal is used in recording an auxiliary clock signal to obtain synchronization information while recording and reproducing information. The wobble signal has a frequency band that has no impact upon a tracking servo-mechanism provided in a recording and/or reproducing apparatus.

Figure 3A:
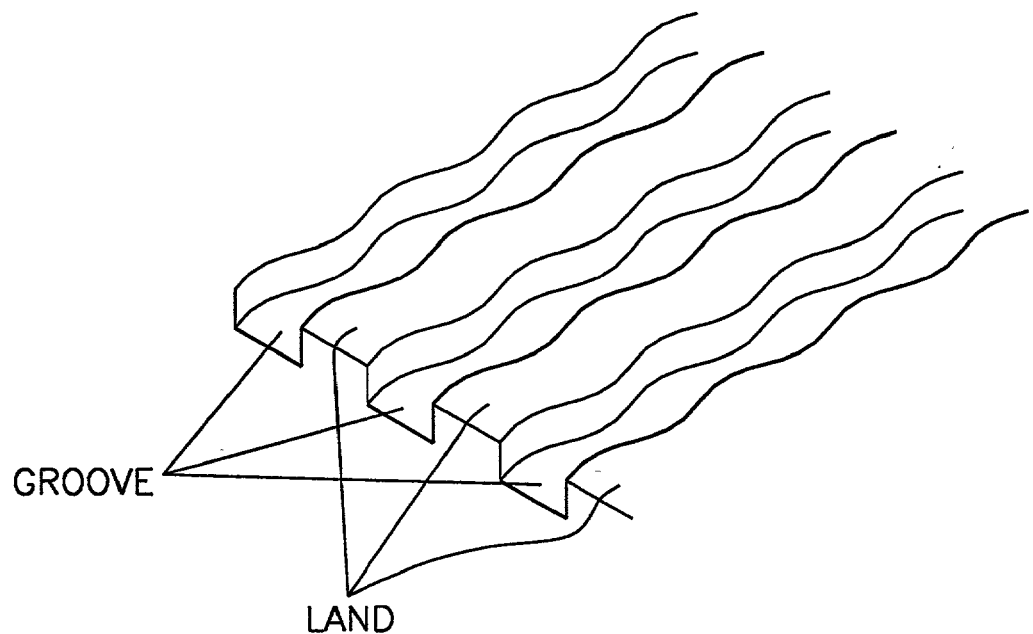
FIGS. 3A and 3B are examples of the information track of FIG. 2.
Figure 3B:
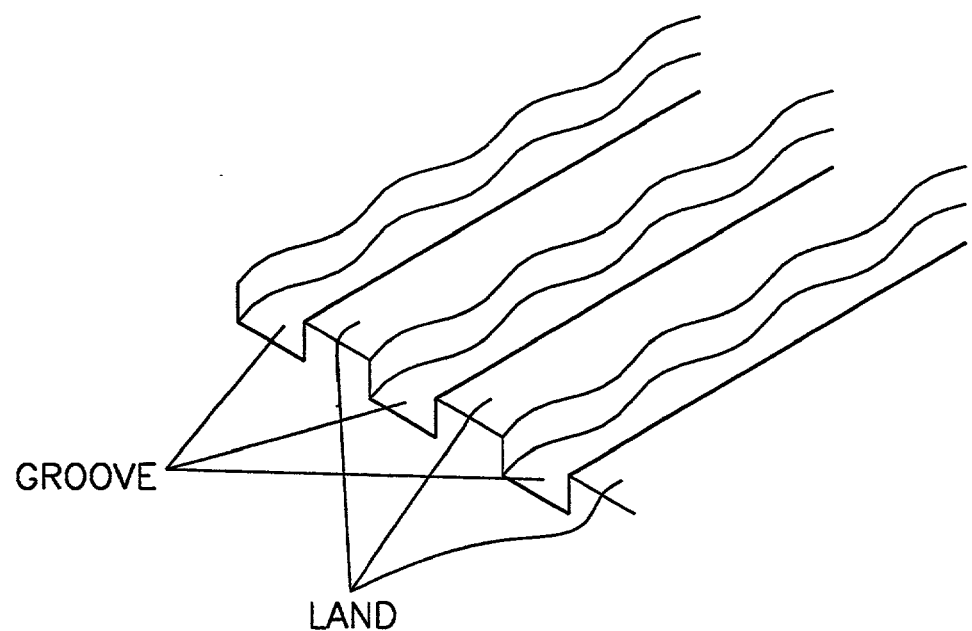

As shown in FIGS. 3A and 3B, when forming a groove track using a laser beam during a process to manufacture a substrate of an optical disc, i.e., a mastering process, a wobble signal is recorded by adding a predetermined amount of offset to the right and left of the laser beam to change the shape of both walls of the groove track. While the wobble signal is recorded along both walls of the groove track in FIG. 3A, it is recorded on only one wall of the groove track in FIG. 3B. In this way, the wobble signal according to the present invention may be recorded on one wall or both walls of the track.

Figure 4:
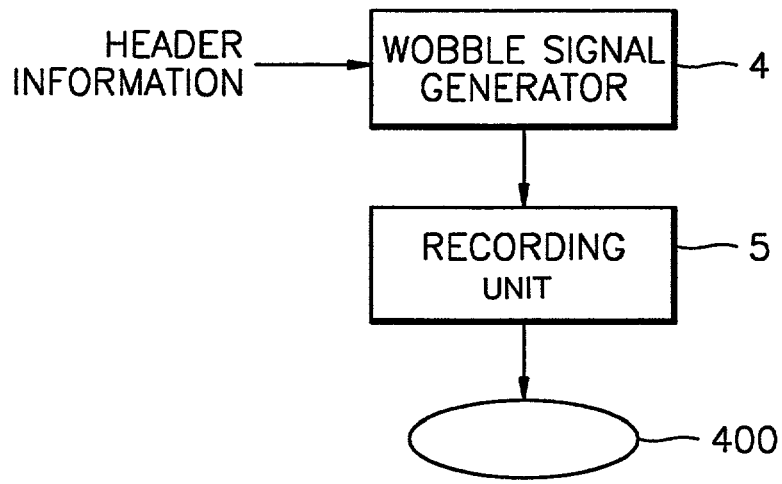
FIG. 4 is a block diagram of a wobble signal recording apparatus according to the present invention.

Referring to FIG. 4, a wobble signal recording apparatus according to the present invention includes a wobble signal generator 4 and a recording unit 5. The wobble signal generator 4 generates a wobble signal according to the present invention. That is, the wobble signal generator 4 uses first and second signals having a same frequency and different edge waveforms with respect to each other, to edge-modulate header information, thereby generating a single-frequency wobble signal having the header information. The recording unit 5 records the wobble signal generated by the wobble signal generator 4 on an optical recording medium 400. To accomplish this, the recording unit 5 includes a pickup device having a laser diode emitting a laser beam.

Figure 5:
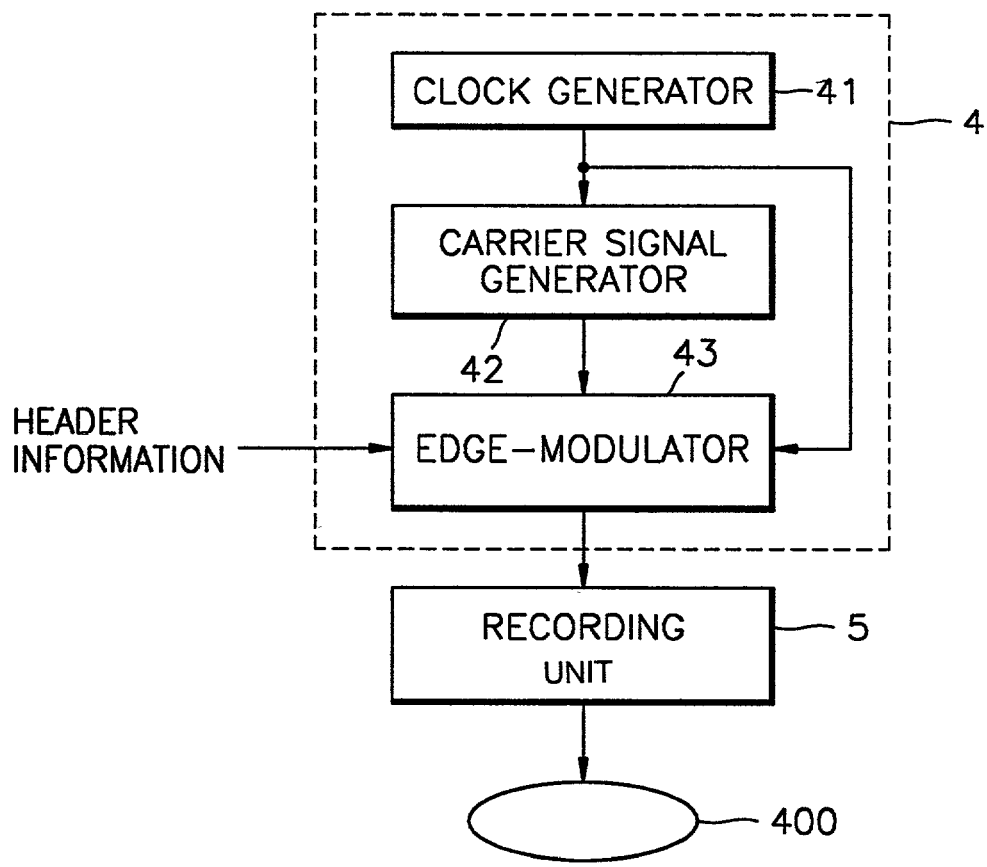
FIG. 5 is a detailed block diagram of the wobble signal recording apparatus of FIG. 4 according to an embodiment of the present invention.

FIG. 5 is a detailed block diagram of the wobble signal recording apparatus of FIG. 4 according to an embodiment of the present invention. Referring to FIG. 5, the wobble signal generator 4 includes a clock generator 41, a carrier signal generator 42, and an edge-modulator 43. The clock generator 41 generates a clock signal. The carrier signal generator 42 generates first and second carrier signals based on the clock signal received from the clock generator 41. The first and second carrier signals generated by the carrier signal generator 42 have the same frequency but different edge waveforms with respect to each other. The edge-modulator 43 receives header information and edge-modulates the header information using the first and second carrier signals, which are carrier signals generated by the carrier signal generator 42 based on the clock signal. Here, the header information contains addressing information.

FIGS. 6A and 6B show waveforms of the first and second carrier signals generated by the carrier signal generator 42 of FIG. 5 according to this embodiment, respectively. Referring to FIGS. 6A and 6B, the first and second carrier signals have the same frequency but different edge waveforms with respect to each other. In particular, the second carrier signal is a sine wave. If a pure wobble interval where a wobble signal has no header information exists, the pure wobble interval is preferably represented with the second carrier signal.

FIG. 7 is a schematic waveform of a wobble signal edge-modulated by the first and second carrier signals of FIGS. 6A and B. Referring to FIG. 7, if the header information is represented by digital data, i.e., in the form of a bit string "10101010", high level "1" and low level "0" correspond to the first and second carrier signals, respectively. That is, the wobble signal according to this embodiment is edge-modulated using the first and second carrier signals.

Figure 8:
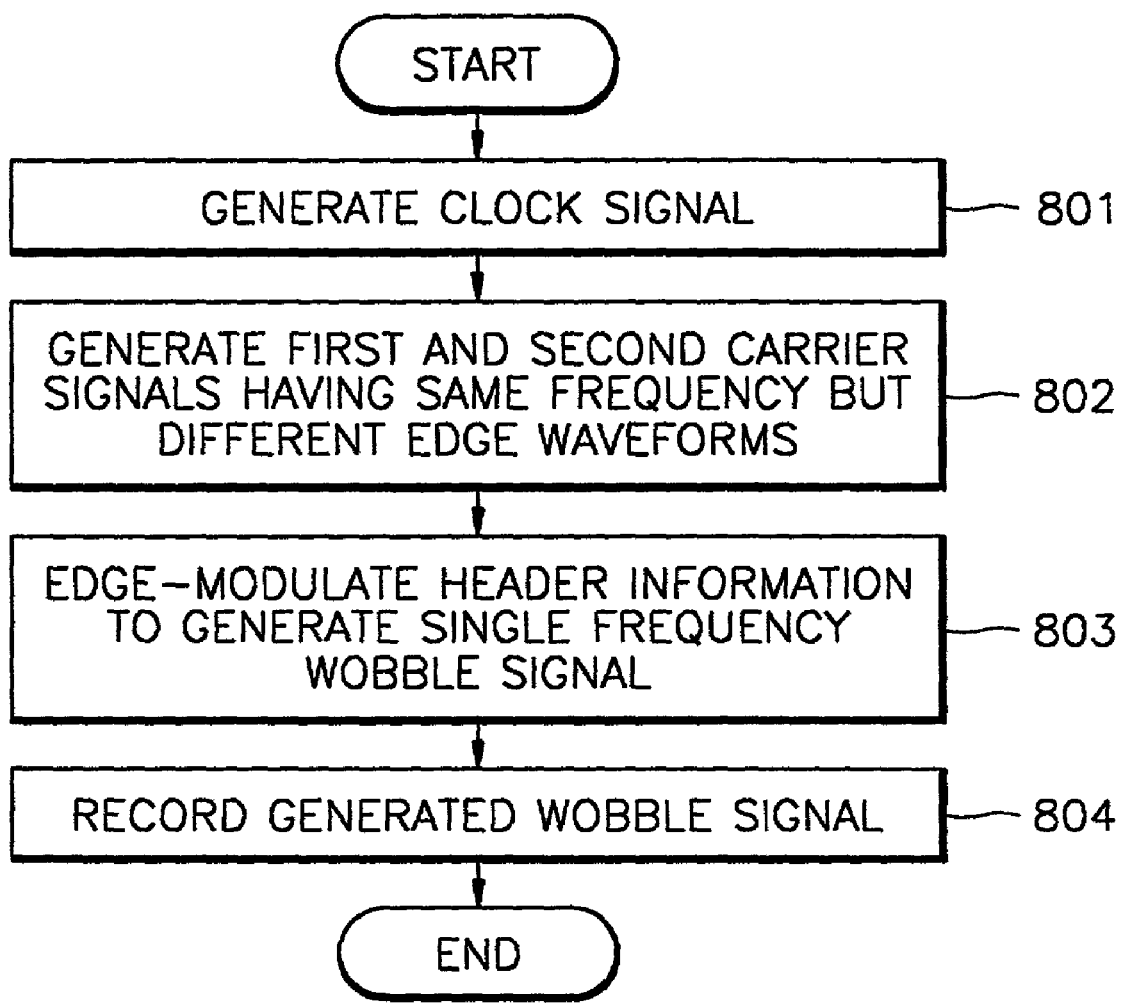
FIG. 8 is a flowchart of a wobble signal recording method according to the embodiment of FIG. 5.

Based on the above configuration, a wobble signal recording method according to the embodiment of FIG. 5 will now be described. FIG. 8 is a flowchart of a wobble signal recording method according to the embodiment of FIG. 5. Referring to FIG. 8, the clock generator 41 generates a clock signal (operation 801). The carrier signal generator 42 generates first and second carrier signals having the same frequency but different edge waveforms with respect to each other based on the clock signal (operation 802). The edge-modulator 43 receives header information and edge-modu-lates the header information, thereby generating a single-frequency wobble signal (operation 803). The recording unit 5 records the generated wobble signal on the optical disc 400 (operation 804).

Figure 9:
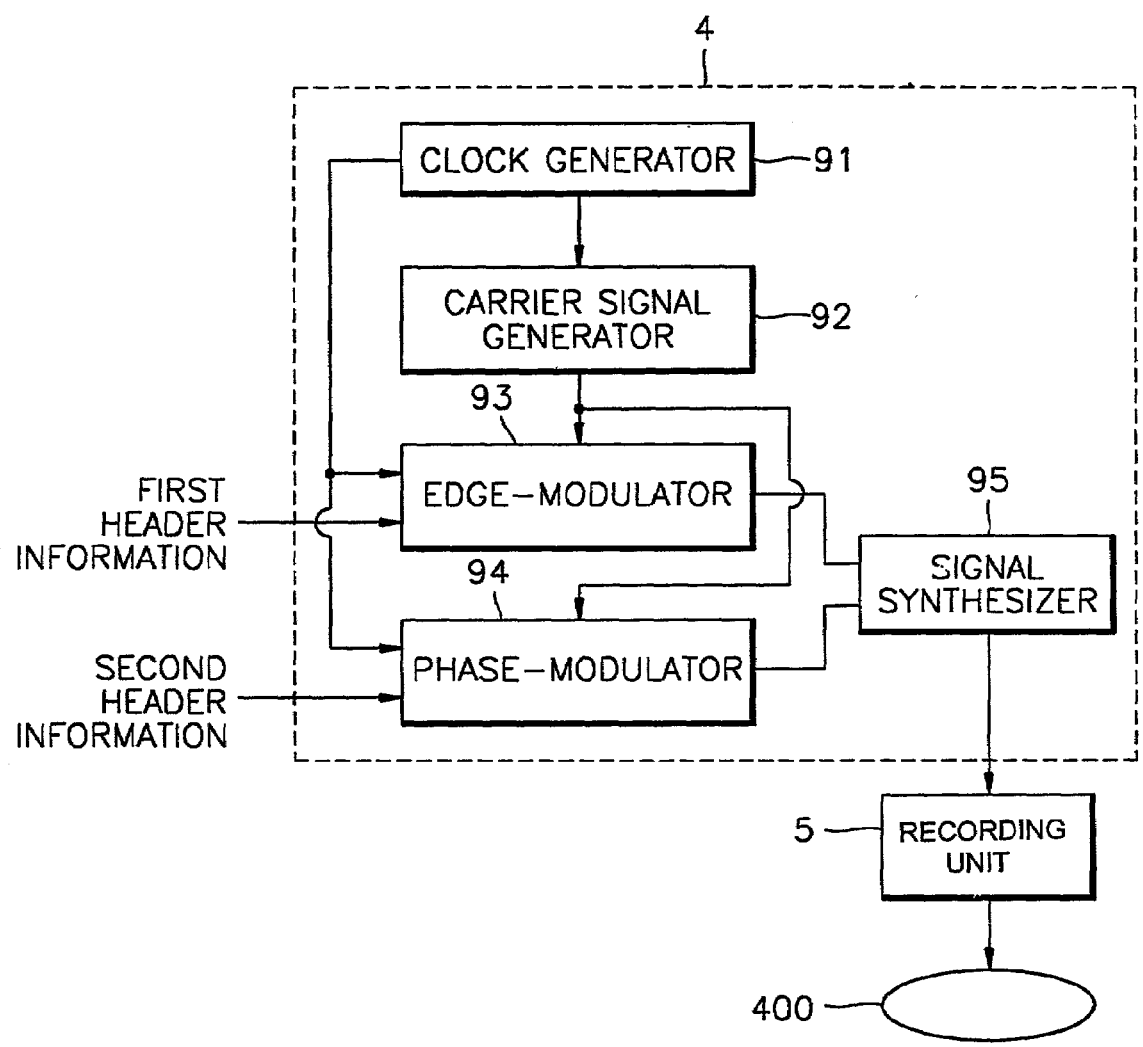
FIG. 9 is a detailed block diagram of the wobble signal recording apparatus of FIG. 4 according to another embodiment of the present invention.

FIG. 9 is a detailed block diagram of the wobble signal recording apparatus of FIG. 4 according to another embodiment of the present invention. Referring to FIG. 9, the wobble signal generator 4 of the wobble signal recording apparatus includes a clock generator 91, a carrier signal generator 92, an edge-modulator 93, a phase-modulator 94, and a signal synthesizer 95. The clock generator 91 generates a clock signal. The carrier signal generator 92 generates one or more carrier signals based on the clock signal received from the clock generator 91. The edge-modulator 93 receives first header information and edge-modulates the first header information using one carrier signal based on the clock signal. The phase-modulator 94 receives second header information and phase-modulates the second header information using one carrier signal based on the clock signal. The signal synthesizer 95 combines the edge-modulated signal with the phase-modulated signal to generate a wobble signal according to this embodiment. Then, the recording unit 5 records the generated wobble signal on the optical disc 400. Here, each of the first and second header information contains addressing information. Since one wobble signal can have the first and second header information, a greater amount of header information can be recorded through a wobble signal. Decreasing the size of the header information interval of the wobble signal and increasing the size of a pure wobble interval where a sine wave propagates enable a clock signal to be detected more stably. Furthermore, if any parts of the first and second header information are the same, this increases the redundancy of header information in the wobble signal, thus reducing occurrences of a detection error.

FIGS. 10A–10C show schematic waveforms of signals generated by the wobble signal generator 4 of FIG. 9. FIG. 10A is a signal edge-modulated by the edge-modulator 93 when a first header information bit string representing first header information by a digital signal is "101", FIG. 10B is a signal phase-modulated by the phase-modulator 94 when a second header information bit string representing second header information by a digital signal is "010", and FIG. 10C is a signal produced by combining the edge-modulated signal for the first header information bit string "101" with the phase-modulated signal for the second header information bit string "010".

Based on the above configuration, a wobble signal recording method according to the embodiment of FIG. 9 will now be described with reference to FIG. 11. Referring to FIG. 11, the clock generator 91 generates a clock signal (operation 1101). The carrier signal generator 92 generates first and second carrier signals having the same frequency but different edge waveforms with respect to each other based on the clock signal (operation 1102). The edge-modulator 93 receives first header information and edge-modulates the first header information using the first and second carrier signals (operation 1103). The phase-modulator 94 receives second header information and phase-modulates the second header information using the first or second carrier signals (operation 1104). The signal synthesizer 95 combines the edge-modulated signal of FIG. 10A with the phase-modulated signal of FIG. 10B to generate the single-frequency wobble signal of FIG. 10C according to this embodiment (operation 1105). The recording unit 5 records the generated wobble signal on the optical disc 400 (operation 1106).

FIGS. 12A–12D and 12E–12G are reference diagrams explaining other examples of wobble signals according to the present invention. FIG. 12A is a signal produced by edge-modulating a first header information bit string, FIG. 12B is a signal produced by phase-modulating a second header information bit string, and FIG. 12C is a signal produced by amplitude-modulating a third header information bit string. The amplitude-modulated signal FIG. 12C is represented by a sine wave in which the high level "1" and the low level "0" have the same waveform and frequency, but a part of the high level "1" interval has an amplitude of 0. That is, the number of one-period waveforms in a signal representing the high level "1" is different from that in a signal representing the low level "0". FIG. 12D is a wobble signal produced by synthesizing the edge-modulated signal FIG. 12A, the phase-modulated signal FIG. 12B, and the amplitude-modulated signal FIG. 12C. Since one wobble signal contains first through third header information as described above, an increased amount of header information can be recorded with the wobble signal. Similar to FIGS. 10A–10C, if any parts of the first, second or third header information are identical to each other, the redundancy of header information is increased while occurrences of a detection is reduced.

Referring to FIGS. 12E–12G, FIG. 12E is a signal produced by edge-modulating a first header information bit string, FIG. 12F is a signal produced by amplitude-modulating a second header information bit string, and FIG. 12G is a wobble signal produced by combining the edge-modulated signal FIG. 12E with the amplitude-modulated signal FIG. 12F. Similar to FIGS. 12A–12D, since the wobble signal has the first and second header information, an increased amount of header information can be recorded through the wobble signal. Furthermore, similar to FIGS. 10A–10C, if any parts of the first and second header information are identical to each other, the redundancy of header information is increased while occurrences of a detection is reduced.

Figure 13:
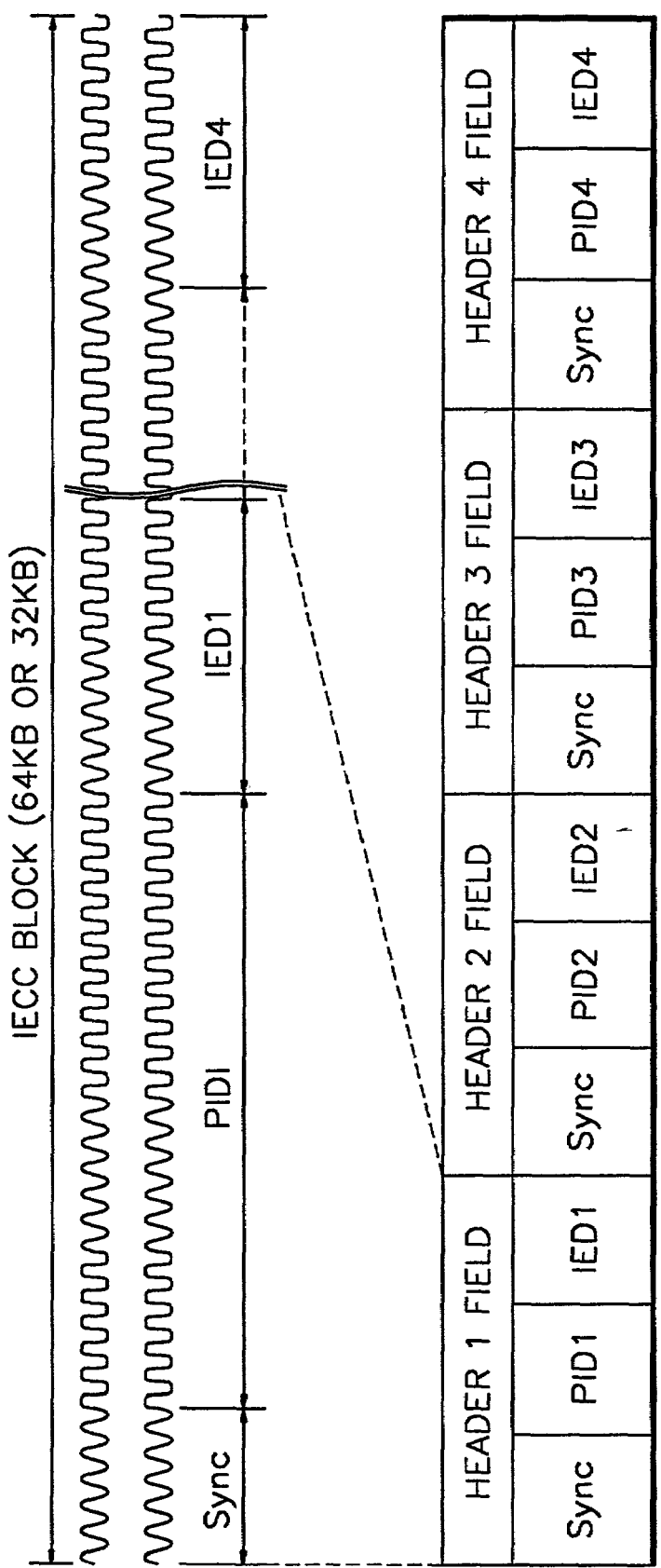
FIG. 13 is an example of addressing information in a header information region on which a wobble signal according to the present invention is recorded.

FIG. 13 is an example of addressing information having a physical identification data (PID) structure at a header information interval in which a wobble signal according to the present invention is recorded. Referring to FIG. 13, a wobble signal having header information comprised of four header fields within one error correction code (ECC) block (having the capacities of 64 or 32 KB in this embodiment) is recorded on an optical disc according to the present invention. Each header field may contain synchronization data detecting an identifier ID, a PID region in which addressing information is stored for each sector, and an ID error detection (IED) region in which error detection information about identifier IDs is stored.

Figure 14:
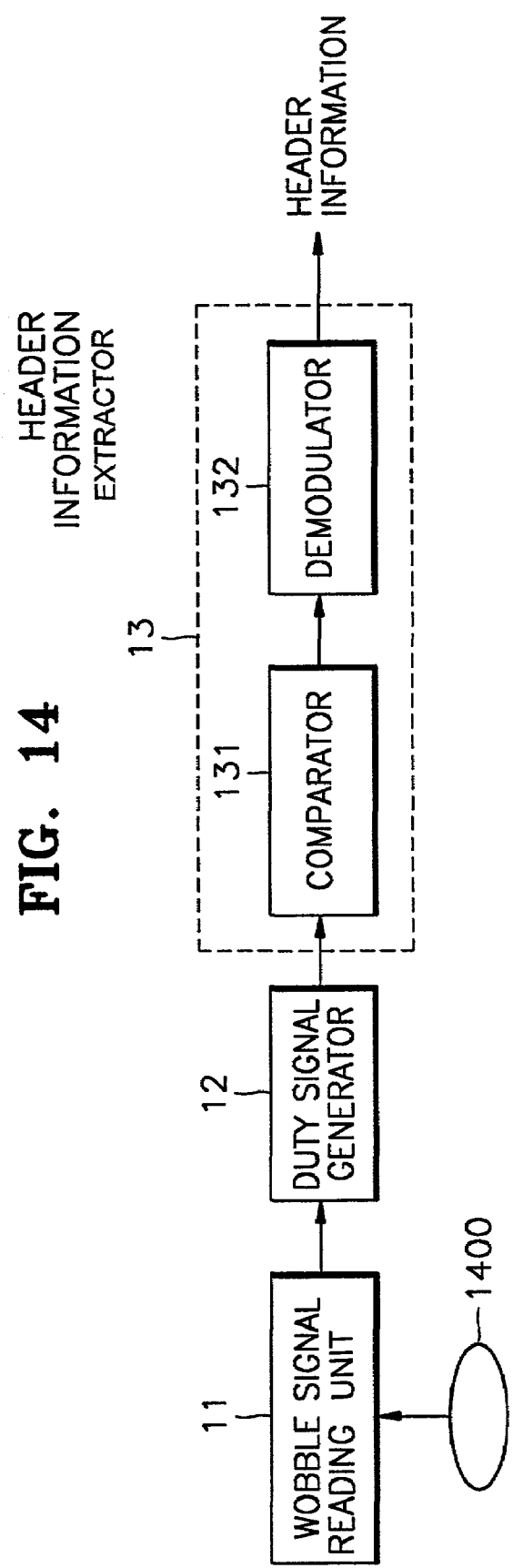
FIG. 14 is a block diagram of a header information detection apparatus according to another embodiment of the present invention.

FIG. 14 is a block diagram of a header information detection apparatus according to another embodiment of the present invention. Referring to FIG. 14, the header information detection apparatus comprises a wobble signal reading unit 11, a duty signal generator 12, and a header information extractor 13. The wobble signal reading unit 11 reads a wobble signal from an optical recording medium 1400. The duty signal generator 12 generates a duty signal from the read wobble signal. More specifically, the duty signal generator 12 according to this embodiment generates a duty signal at an upper level, which is higher than a central level of the read wobble signal by a predetermined level, and a duty signal at a lower level, which is lower than the central level of the read wobble signal by a predetermined level. The header information extractor 13 includes a comparator 131 and a demodulator 132 in order to extract header information by comparing the duty signals. The comparator 131 compares duty ratios of corresponding duty signals generated by the duty signal generator 12 and generates binary data. The demodulator 132 demodulates header information from the binary data generated by the comparator 131. A demodulation method performed by the demodulator 132 is determined depending on a method of header information encoding. For example, if the wobble signal has header information bi-phase encoded and then edge-modulated according to the present invention, the demodulator 132 extracts the header information through bi-phase decoding.

Figure 15A:
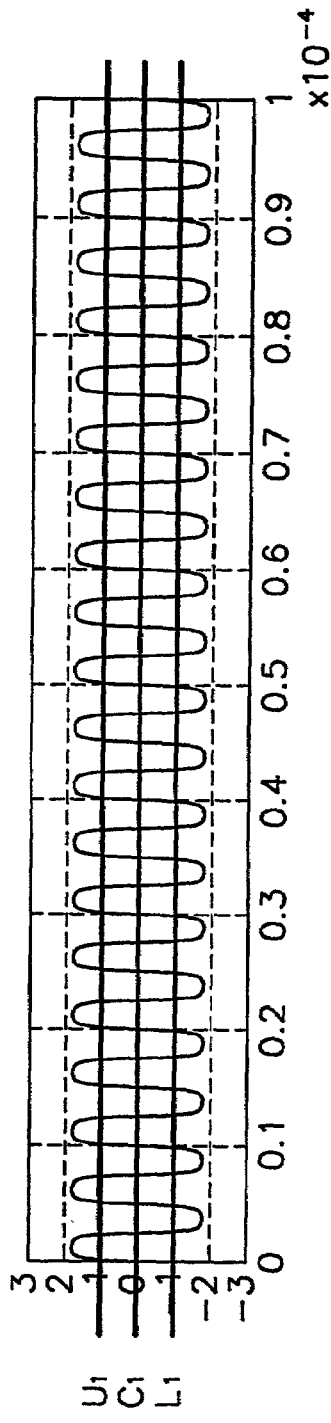
FIG. 15 is a reference diagram explaining a process generating a duty signal in the duty signal generator 12 of FIG. 14.
Figure 15B:
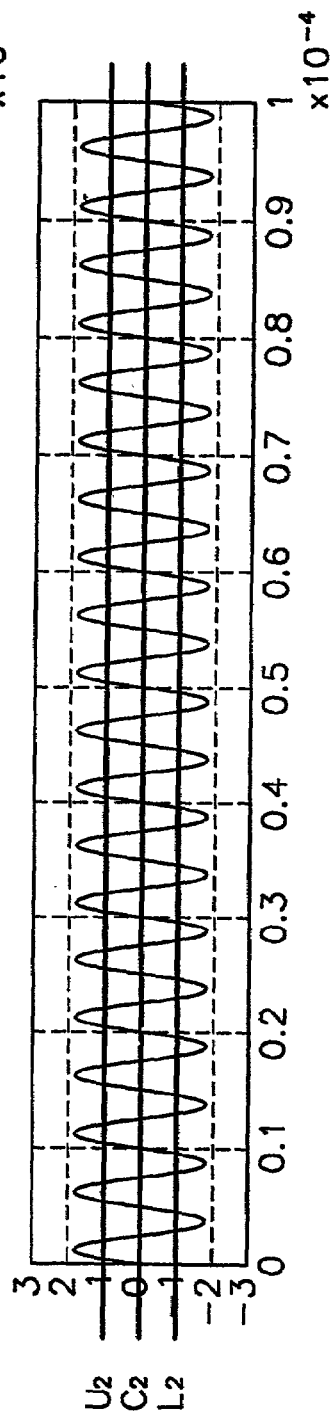
Figure 15C:
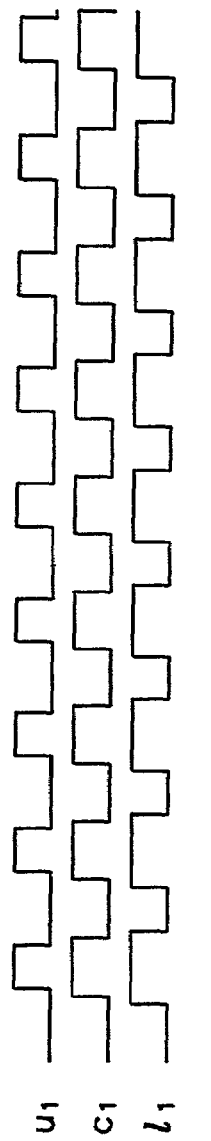
Figure 15D:
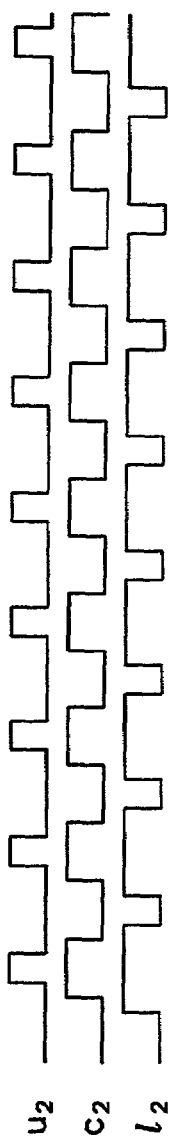

FIGS. 15A–15D are reference diagrams explaining a process that generates a duty signal in the duty signal generator 12. FIG. 15A is a schematic waveform of a wobble signal composed of the first signal used in edge-modulation, and FIG. 15B is a schematic waveform of a wobble signal composed of the second signal used in edge-modulation. The duty signal generator 12 generates duty signals at central levels $C_1$ and $C_2$ of the read wobble signals 15A and 15B, at upper levels $U_1$ and $U_2$, which are higher than the central levels $C_1$ and $C_2$ by a predetermined level, respectively, and at lower levels $L_1$ and $L_2$, which are lower than the central levels $C_1$ and $C_2$ by a predetermined level, respectively. FIG. 15C shows duty signals $c_1$, $u_1$ and $I_1$ generated on the basis of the first signal, and FIG. 15D shows duty signals $c_2$, $u_2$ and $I_2$ generated on the basis of the second signal. As shown in FIGS. 15A–15D, the duty ratio of the duty signal $u_1$ is larger than that of the duty signal $u_2$, while the duty ratio of the duty signal $I_1$ is smaller than that of the duty signal $I_2$. Since the duty signals $u_1$ and $I_1$ generated from the first signal are different from the duty signals $u_2$ and $I_2$ generated from the second signal, binary data can be detected through the duty ratios of the duty signals $c_1$, $u_1$ and $I_1$ and $c_2$, $u_2$ and $I_2$. Here, a level for detecting a duty signal is preferably determined as an appropriate value through a test.

Figure 16:
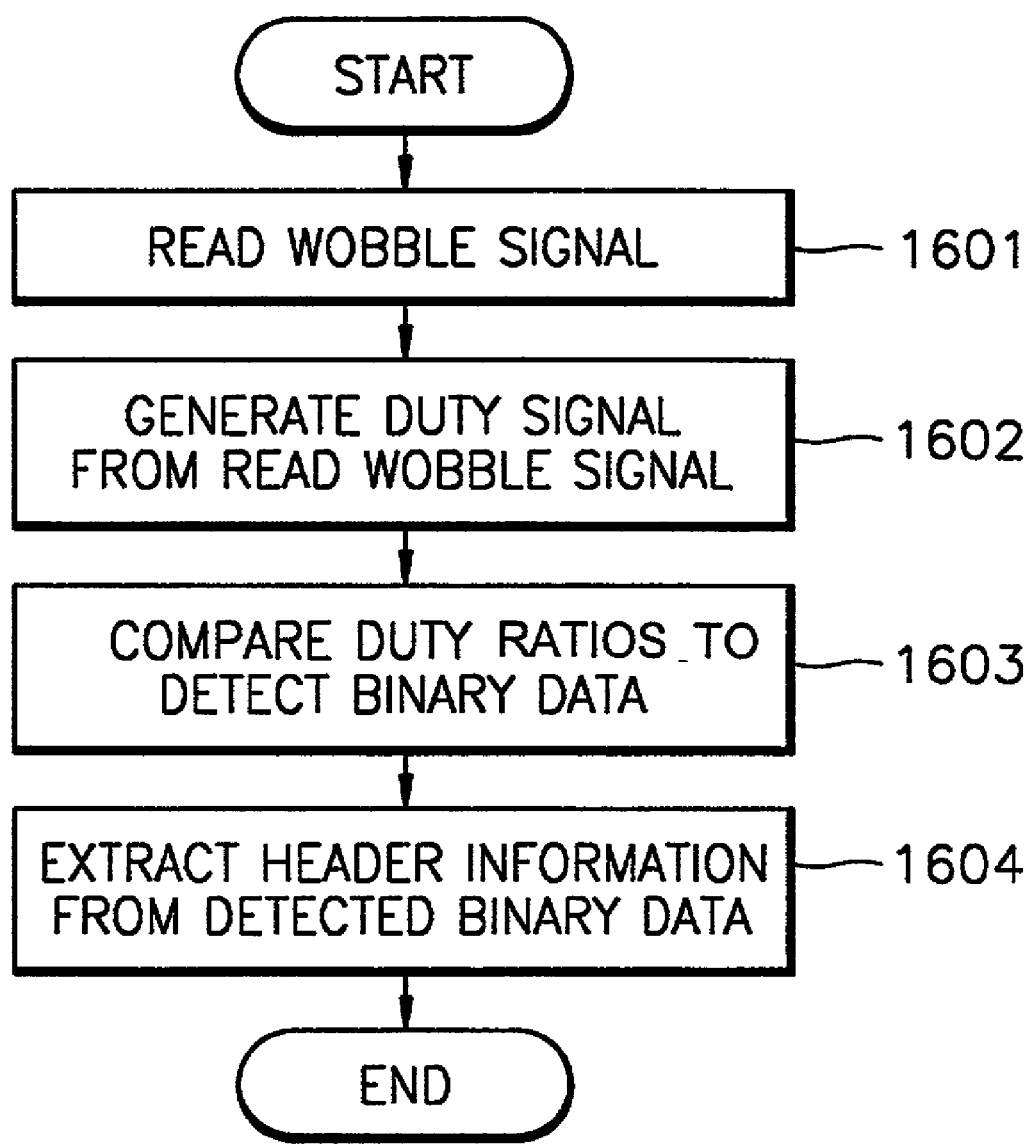
FIG. 16 is a flowchart of a header information extraction method according to the embodiment of FIG. 14.

Based on the above configuration, a header information extraction method according to the embodiment of FIG. 14 will now be described with reference to FIG. 16. Referring to FIG. 16, the wobble signal reading unit reads a wobble signal from the optical recording medium 1400 (operation 1601). The duty signal generator 12 generates duty signals for predetermined levels of the read wobble signal (operation 1602). The comparator 131 detects the duty ratios of the generated duty signals to detect binary data based on the duty ratios (operation 1603). The demodulator 132 demodulates header information from the detected binary data (operation 1604).

Figure 17:
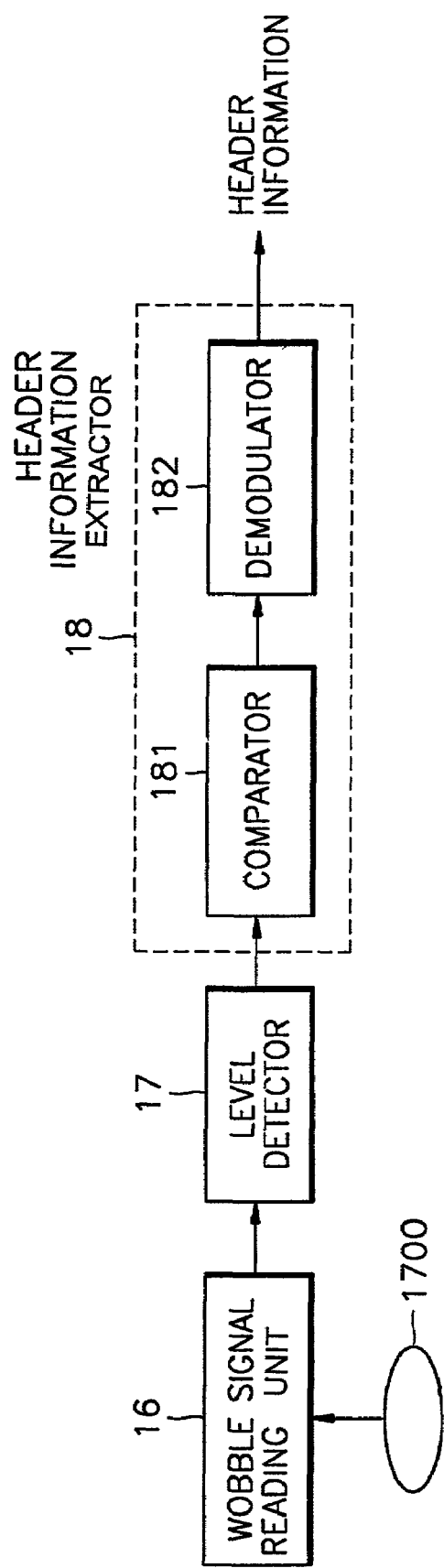
FIG. 17 is a block diagram of a header information detection apparatus according to another embodiment of the present invention.

FIG. 17 is a block diagram of a header information detection apparatus according to another embodiment of the present invention. Referring to FIG. 17, the header information detection apparatus comprises a wobble signal reading unit 16, a level detector 17, and a header information extractor 18. The wobble signal reading unit 16 reads a wobble signal from an optical recording medium 1700. The level detector 17 detects levels of the read wobble signal. More specifically, the level detector 17 detects a level at an instant which is a predetermined time in advance of or behind the time when amplitude of the read wobble signal is zero. The header information extractor 18 includes a comparator 181 and a demodulator 182 in order to extract the header information by comparing the detected levels. The comparator 181 compares the levels detected by the level detector 17 to create binary data, and the demodulator 182 demodulates header information from the binary data created by the comparator 181. Similarly, a demodulation method performed by the demodulator 182 is determined depending on which method is used in header information encoding. For example, if the header information of the wobble signal is bi-phase encoded and then edge-modulated according to the present invention, the demodulator 182 extracts the header information through bi-phase decoding.

Figure 18:
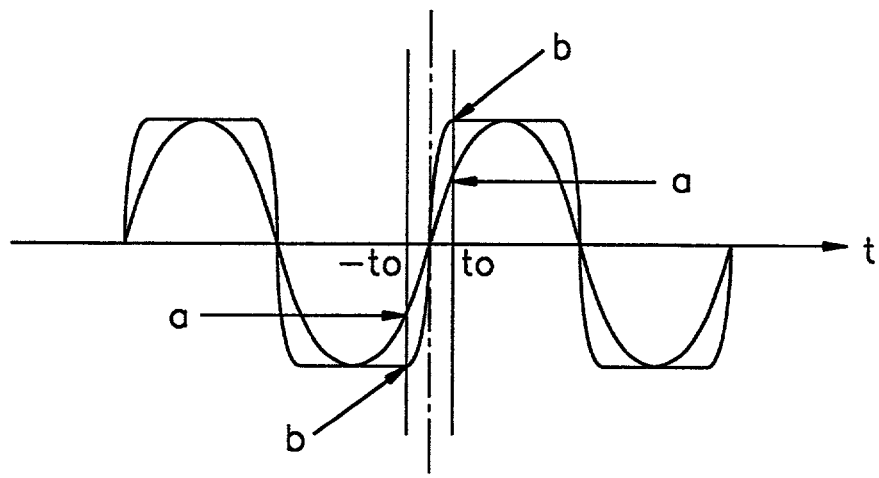
FIG. 18 is a reference diagram explaining a level detection method performed by the level detector 17 of FIG. 17.

FIG. 18 is a reference diagram explaining a level detection method performed by the level detector 17 of FIG. 17. Referring to FIG. 18, the level detector 17 detects a level at the instant, which is a predetermined time in advance of or behind the instant that amplitude of the read wobble signal is zero. As shown in FIG. 18, the level of a first signal having a trapezoidal waveform at predetermined points in time $-t_0$ and $t_0$ is b, and the level of a second signal having a sinusoidal waveform at the same points in time $-t_0$ and $t_0$ is a, where a is less than b. Thus, the levels of the first and second signals at the predetermined points in time $-t_0$ and $t_0$ are compared directly with each other, or the detected levels are compared with an appropriate reference value determined between a and b, thereby generating binary data.

Figure 19:
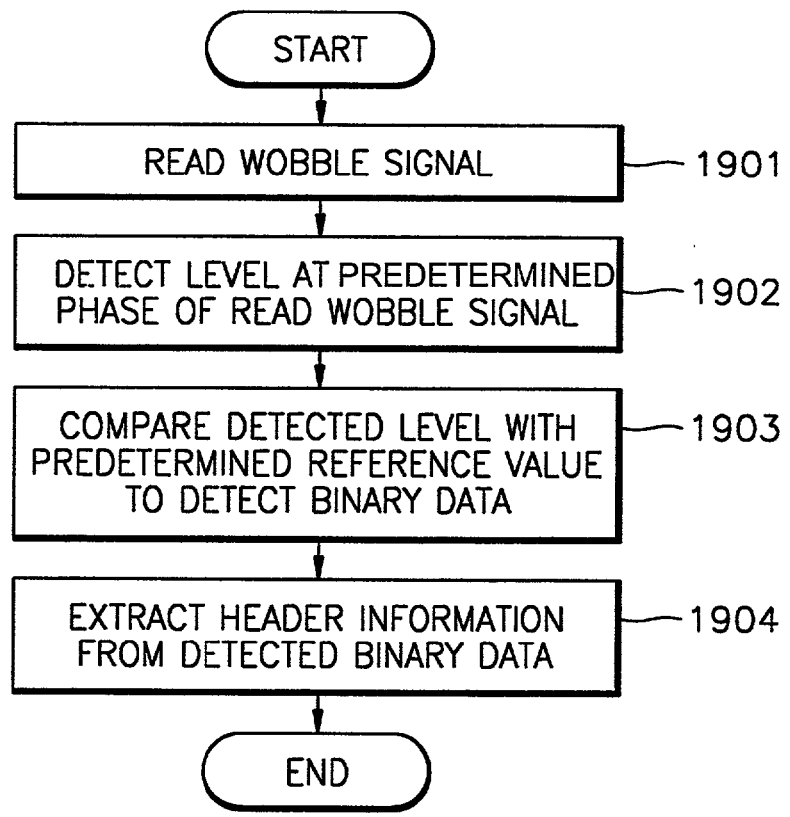
FIG. 19 is a flowchart of a header information extraction method according to the embodiment of FIG. 17.

Based on the above configuration, a header information extraction method according to the embodiment of FIG. 17 will now be described with reference to FIG. 19. Referring to FIG. 19, the wobble signal reading unit 16 reads a wobble signal from the optical recording medium 1700 (operation 1901). The level detector 17 detects the level of the read wobble signal at a predetermined phase (operation 1902). The comparator 181 compares the detected levels with a predetermined reference value to detect binary data based on the comparison result (operation 1903). The demodulator 182 demodulates header information from the detected binary data (operation 1904).

Figure 20:
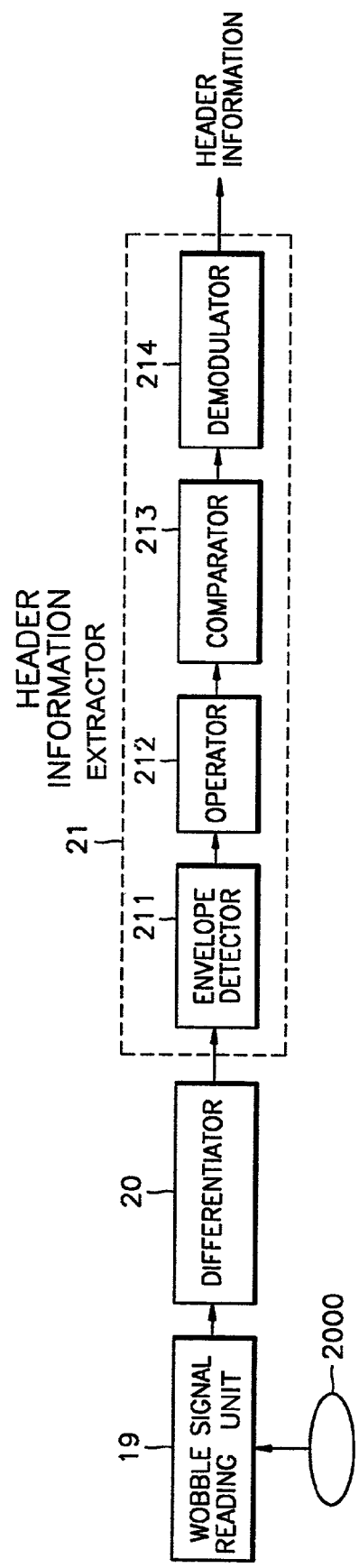
FIG. 20 is a block diagram of a header information detection apparatus according to another embodiment of the present invention.

FIG. 20 is a block diagram of a header information extraction apparatus according to yet another embodiment of the present invention. Referring to FIG. 20, the header information extraction apparatus comprises a wobble signal reading unit 19, a differentiator 20, and a header information extractor 21.

The wobble signal reading unit 19 reads a wobble signal from an optical reading medium 2000. The differentiator 20 generates a differential signal. The header information extractor comprises an envelope detector 211, an operator 212, a comparator 213, and a demodulator 214. The envelope detector 211 detects upper and lower envelope signals of the differential signal from the differentiator 20. The operator 212 subtracts the lower envelope signal from the upper envelope signal to obtain a difference signal. The comparator 213 compares the level of the difference signal obtained by the operator 212 with a predetermined reference value to create binary data. The demodulator 214 demodulates the created binary data to extract header information. Similarly, a demodulation method performed by the demodulator 214 is determined depending on a method of header information encoding. For example, if the header information of the wobble signal is bi-phase encoded and then edge-modulated according to the present invention, the demodulator 214 extracts the header information through bi-phase decoding.

Figure 21A:
FIG. 21 is a reference diagram explaining signals output from the header information detection apparatus of FIG. 20.
Figure 21B:
Figure 21C:
Figure 21D:

FIGS. 21A through 21D are reference diagrams explaining signals output from the header information extraction apparatus of FIG. 20. FIG. 21A is an edge-modulated wobble signal read by the wobble signal reading portion 19 and FIG. 21B is a differential signal obtained from the wobble signal of FIG. 21A by the differentiator 20. FIG. 21C shows upper and lower envelope signals detected for the differential signal of FIG. 21B by the envelope detector 211, and FIG. 21D is a difference signal produced by subtracting the lower envelope signal from the upper envelope signal. The difference signal is compared with the wobble signal of FIG. 21A to extract binary data in the wobble signal from the difference signal.

Based on the above configuration, a header information extraction method according to the embodiment of FIG. 20 will now be described with reference to FIG. 22. Referring to FIG. 22, the wobble signal reading unit 19 reads the wobble signal shown in FIG. 21A from the optical recording medium 2000 (operation 2201). The differentiator 20 generates the differential signal shown in FIG. 21B from the read wobble signal (operation 2202). The envelope detector 211 detects an envelope signal or the generated differential signal (operation 2203). The header information detector 21 performs a predetermined operation on the detected envelope signal to extract header information (operation 2204).

FIG. 23 is a flowchart explaining an example of the operations 2203 and 2204 shown in FIG. 22. Referring to FIG. 23, during the operation 2203 of FIG. 22, the envelope detector 211 of FIG. 20 detects an upper envelope signal of the differential signal (operation 2301) and then a lower envelope signal thereof (operation 2302). The operator 212 outputs a difference signal of the upper and lower envelope signals (operation 2303). The comparator 213 compares the level of the difference signal with a predetermined reference value to output binary data (operation 2304). The demodulator 214 demodulates the output binary data to extract header information (operation 2305). Here, a demodulation method to be adopted by the demodulator 214 is determined in accordance with a modulation method adopted during the recording operation.

As described above, the present invention records a wobble signal generated by modulating header information using carrier signals having the same frequency, thereby extracting the header information from the wobble signal while detecting a clock signal more stably. Furthermore, multiple header information can be recorded in the same interval of the wobble signal, thereby increasing the recording density of header information.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An optical recording medium, comprising:
    a wobbled track on which user data is recorded, wherein a wobble signal included on the wobbled track is a single-frequency signal having edge-modulated first header information, wherein the edge-modulated first header information is based on first and second signals having a same frequency but different edge waveforms.

2. The optical recording medium of claim 1, wherein the first header information contains addressing information.

3. An apparatus recording a wobble signal on an optical recording medium, the apparatus comprising:
    a wobble signal generator generating a single-frequency wobble signal having header information which is edge-modulated based on first and second carrier signals having a same frequency and different edge waveforms; and
    a recording unit recording the wobble signal generated by the wobble signal generator on the optical recording medium.

4. The apparatus of claim 3, wherein the wobble signal generator comprises:

a clock generator generating a clock signal;

a carrier signal generator generating the first and second carrier signals based on the clock signal; and an edge-modulator that receives header information and edge-modulates the header information using the first and second carrier signals output from the carrier signal generator based on the clock signal.

5. The apparatus of claim 4, wherein the edge-modulator transforms high and low levels of digital data representing the header information into the first and second carrier signals, respectively, to modulate the digital data into an analog signal.

6. The apparatus of claim 5, wherein the header information contains addressing information.

7. The apparatus of claim 4, wherein the second carrier signal is a sine wave.

8. A method of recording a wobble signal on an optical recording medium, the method comprising the operations of:

generating first and second carrier signals having a same frequency and different edge waveforms;

generating a single-frequency wobble signal having header information which is edge-modulated using the generated first and second carrier signals; and recording the generated single-frequency wobble signal on the optical recording medium.

9. The method of claim 8, wherein the operation of generating a single-frequency wobble signal further comprises:

generating a clock signal; and edge-modulating header information using the first and second carrier signals in accordance with the generated clock signal.

10. The method of claim 9, wherein, the operation of edge-modulating header information comprises transforming high and low levels of digital data representing header information into the first and second carrier signals, respectively, to modulate the digital data into an analog signal.

11. The method of claim 10, wherein the header information contains addressing information.

12. An optical recording medium, comprising:

a wobbled track on which user data is recorded, wherein a wobble signal included on the wobbled track is a single-frequency signal having edge-modulated first header information, wherein the edge-modulated first header information is based on a first signal having the single-frequency with a first waveform shape and a second signal having the single-frequency with a second waveform shape different from the first waveform shape.

13. The optical recording medium of claim 12, wherein the first header information contains addressing information.

14. An apparatus recording a wobble signal on an optical recording medium, the apparatus comprising:

a wobble signal generator generating a single-frequency wobble signal having header information which is edge-modulated based on a first signal having the single-frequency with a first waveform shape and a second signal having the single-frequency with a second waveform shape different from the first waveform shape; and a recording unit recording the wobble signal generated by the wobble signal generator on the optical recording medium.

15. The apparatus of claim 14, wherein the wobble signal generator comprises:

a clock generator to generate a clock signal;

a carrier signal generator to generate the first and second signals based on the clock signal; and an edge-modulator to receive header information and edge-modulate the header information using the first and second signals output from the carrier signal generator based on the clock signal.

16. The apparatus of claim 15, wherein the edge modulator transforms high and low levels of digital data representing the header information into the first and second signals, respectively, to modulate the digital data into an analog signal.

17. The apparatus of claim 16, wherein the header information contains addressing information.

* * * * *

UNITED STATES PATENT AND TRADEMARK OFFICE
CERTIFICATE OF CORRECTION

PATENT NO.        : 7,123,568 B2
APPLICATION NO. : 09/994785
DATED             : October 17, 2006
INVENTOR(S)       : Byoung-ho Choi et al.

It is certified that error appears in the above-identified patent and that said Letters Patent is hereby corrected as shown below:

Column 14, line 31, change "edge modulator" to -- edge-modulator --

Signed and Sealed this

Twentieth Day of February, 2007

JON W. DUDAS
*Director of the United States Patent and Trademark Office*